E. DIMOND.
FREIGHT CAR.
APPLICATION FILED MAR. 7, 1921.
1,385,206.
Patented July 19, 1921.
2 SHEETS—SHEET 2.
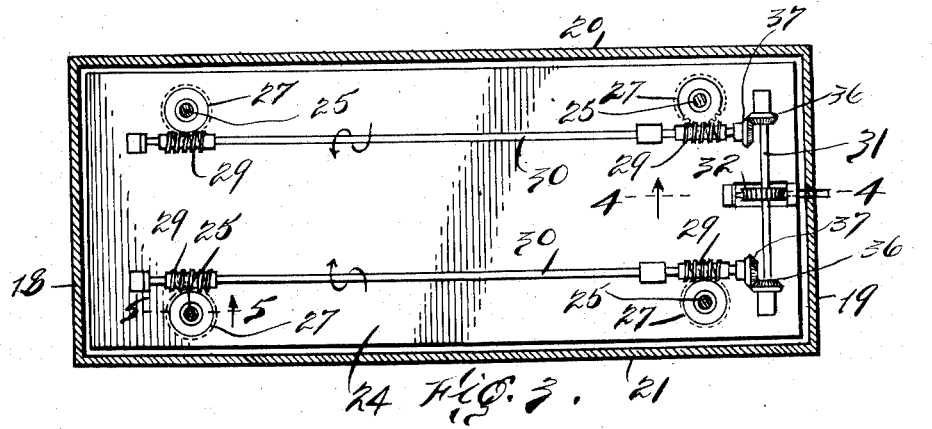
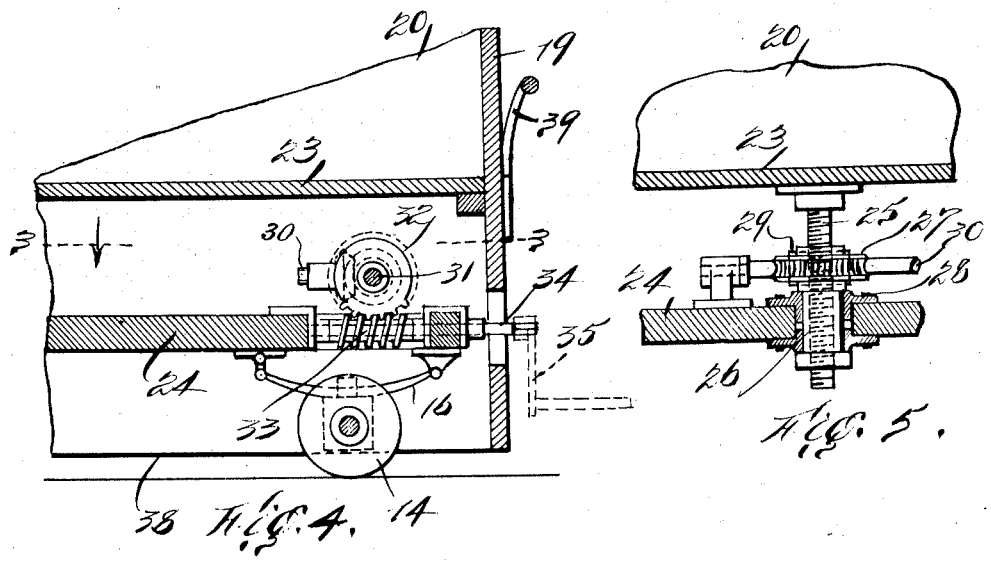
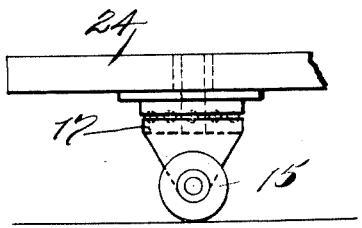
Inventor
Emil Dimond
By his Attorney

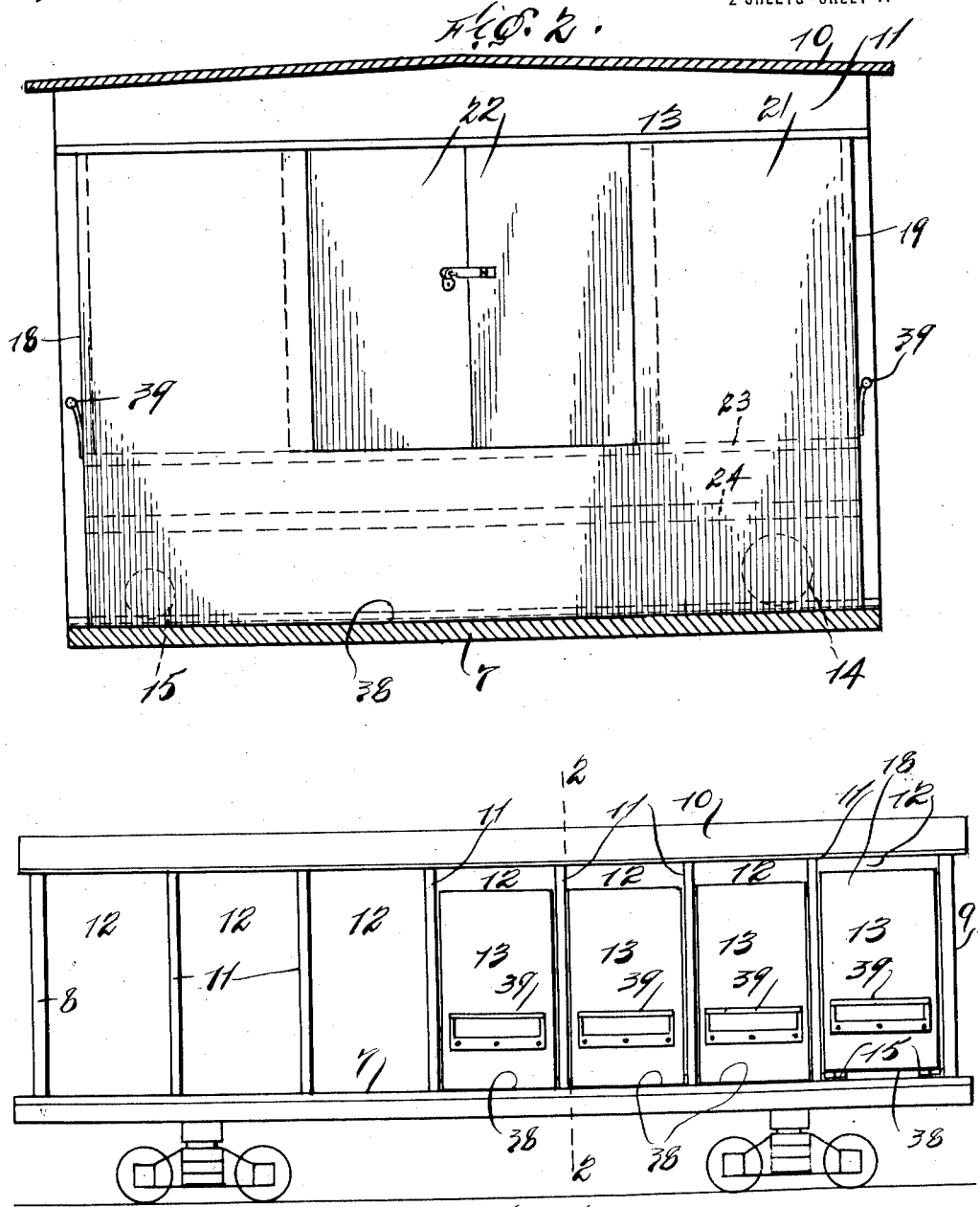

UNITED STATES PATENT OFFICE.

EMIL DIMOND, OF PROVIDENCE, RHODE ISLAND.

FREIGHT-CAR.

1,385,206.   Specification of Letters Patent.   Patented July 19, 1921.

Application filed March 7, 1921. Serial No. 450,244.

*To all whom it may concern:*

Be it known that I, EMIL DIMOND, a resident of Providence, Providence county, State of Rhode Island, and a citizen of the United States of America, have invented certain new and useful Improvements in Freight-Cars, of which the following is a specification.

This invention relates to improvements in freight cars, one of the objects being to provide a freight car that can be rapidly loaded and also one that will transport goods with less danger of breakage. My improved freight car is arranged so as to eliminate rehandling of goods, that is to say, eliminate the removal of goods in order to gain access to other goods that are to be unloaded. It frequently occurs that in order to remove goods from a freight car, at a given point, other goods have to be removed from the car; this necessitates double handling, as the goods, intended for some other points of distribution, have to be again placed in the car. My improved freight car is arranged so that the chances of theft are greatly reduced, as will hereinafter be set forth; also shifting of the contents of the car is to a large extent obviated.

To carry out my invention I provide a car having open sides and partitions extending transversely of the car to provide a plurality of compartments. In combination with the car described, I employ closed trucks, or relatively small cars, there being a truck for each partition arranged to closely fit within same. These closed trucks have doors in the sides thereof through which the truck is loaded. When in position within the compartments, the ends of the trucks form the sides of the car. As the trucks will be disposed transversely of the car, the doors thereof will be protected by the partitions, and cannot be opened, while the trucks are located within the compartments. The trucks will be rolled into the compartments, being provided with wheels for the purpose. Other features of improvement will hereinafter appear.

In the accompanying drawings, which form part of this specification:—

Figure 1 is a side view of my improved freight car;

Fig. 2 is an enlarged cross-sectional view, the section being taken on a line 2—2 in Fig. 1;

Fig. 3 is a sectional plan view of one of the trucks, the section being taken on a line 3—3 in Fig. 4;

Fig. 4 is an enlarged vertical sectional view, the section being taken on a line 4—4 in Fig. 3, the raising and lowering mechanism being omitted;

Fig. 5 is a similar view, the section being taken on a line 5—5 in Fig. 3; and

Fig. 6 is a fragmentary detail view of one end of one of the trucks.

Referring to Fig. 1, my invention consists of a freight car made up of a floor member 7, end members 8 and 9, a top 10 and a plurality of transverse partitions 11 to provide a plurality of compartments 12. Each compartment 12 is designed to receive a truck 13 carrying wheels 14 and 15. The wheels 14 of each truck are mounted on springs 16 (see Fig. 4) while the wheels 15 are carried by a swivel frame 17, in order that the trucks 13 can be steered. Each truck 13 consists of end members 18 and 19 and side members 20 and 21 having doors 22. Further elements of the trucks are the bottom member 23 and platform 24 which carries the wheels 14 and 15. The box portion of each truck 13 is connected to its platform 24 by threaded posts 25. Each post 25 engages the threaded hub 26 of a worm-gear 27 rotatably supported by a bearing 28 carried by the platform 24. Each gear 27 is engaged by a worm 29. The worms 29 are carried by shafts 30 which are rotated in unison by a shaft 31, which in turn carries a worm gear 32 operated by a worm 33. The worm 33 is supported by a shaft 34 operated by a crank 35, indicated by dotted lines in Fig. 4. The crank 35 is detachable and is applied only at such times as will be hereinafter set forth. Each end of shaft 31 carries a gear 36 meshing with a similar gear 37 on the adjacent end of each shaft 30. When shaft 31 is operated, shafts 30 will be operated to rotate the worm gears 27 which in turn will raise or lower, as the case may be, the threaded posts 25 carried by the box portion of the truck 13.

The object of the elevating and lowering mechanism, consisting of the posts 25 and associated gearing described, is to elevate or lower the box portion of the truck 13. When a truck is to be transported from place to place upon a platform or a floor or within a room, such as a storeroom, or is to be placed in a compartment 12 of a car such as herein described, the box portion of the truck will be elevated so that its lower edges 38 will clear the ground to allow the wheels 14 and 15 to bear the weight of the structure and to rotate in order that the truck can be moved. It will, of course, be apparent that the trucks will be wheeled into the compartments 12 from a platform suitably positioned relative to the floor 7 of the car. After a truck has been wheeled into a compartment, the box thereof will be lowered by operating the crank 35, which at such a time will be applied to the shaft 34, until the lower edges 38 rest upon the floor 7 of the car and the wheels slightly raised therefrom, as indicated in Figs. 1 and 2. The truck box will now rest upon the floor of the car and not upon the wheels 14 and 15; hence, it will remain secure. When the trucks are within the compartments 12, the doors 22 cannot be opened, as they are not accessible. The end walls of the trucks form the end walls of the compartments after the trucks are moved into the compartments. When a truck is to be removed from a compartment, the handle 35 will be applied to the shaft 34 of the truck to be removed and the box portion of said truck will be raised to cause the lower edge 38 to clear the floor 7 and the wheels 14 and 15 to contact with the floor. After the above has been accomplished, the truck can be wheeled out of the compartment onto a suitable platform or other support.

It will of course, be understood that the trucks will be loaded exteriorly of the compartments 12 and moved thereto. To facilitate the handling or wheeling of the trucks, same may be provided with handles 39.

After having arrived at a point of distribution, the truck containing the goods for the said point can be removed from its compartment without disturbing the remaining trucks; hence, undue delay and labor can be prevented.

By referring to Fig. 4, it will be seen that the floor 23 of the box portion of the truck 13 is located some distance from the lower edges 38 in order to provide space for the platform 24 and gearing supported thereby.

Having described my invention, what I claim is:—

1. The combination of a freight car open at the sides thereof, partitions extending transversely thereof to provide compartments, platforms having wheels permanently connected thereto arranged to be moved into or out of said compartments, a closed box carried by each platform having openings for loading same, and means to lower each box upon its wheels after it has been moved into a compartment to cause said box to rest upon a portion of the car.

2. The combination of a freight car open at the sides thereof, partitions extending transversely thereof to provide compartments, platforms having wheels, arranged to be moved into or out of said compartments, a closed box permanently connected to each platform and having openings for the loading thereof, each box being arranged to be raised or lowered upon its platform, and means carried by each platform to operate its box to cause said box to rest upon a portion of the car after the box has been moved into a compartment.

3. In combination with a freight car, a closed box, wheels permanently connected thereto to enable the box to be moved onto the freight car and means to lower the box upon its wheels to cause it to rest upon a portion of the freight car after said box has been positioned upon the car.

4. A truck consisting of a closed body portion, a platform thereunder and permanently connected thereto, wheels carried by the platform, a raising and lowering mechanism connecting the platform and body portion of the truck, depending elements associated with the body of the truck, and means to actuate the raising and lowering mechanism to cause the depending elements of the truck body to contact with the ground or to clear the same.

5. A truck consisting of a closed body portion, a platform thereunder and permanently connected thereto, the sides and ends of the body portion enveloping said platform and extending below same, wheels carried by the platform, threaded posts carried by the body portion, a worm gear having a threaded hub engaging each post, a worm engaging each worm gear, and means to operate said worms to actuate the gears meshed therewith to raise or lower the posts carried by the body portion of the truck, whereby the depending sides and ends of the body portion can be caused to rest upon the ground or clear the same.

EMIL DIMOND.